No. 793,398. PATENTED JUNE 27, 1905.
H. A. SCHERMERHORN.
FASTENING FOR WAGON END GATES.
APPLICATION FILED MAR. 24, 1905.
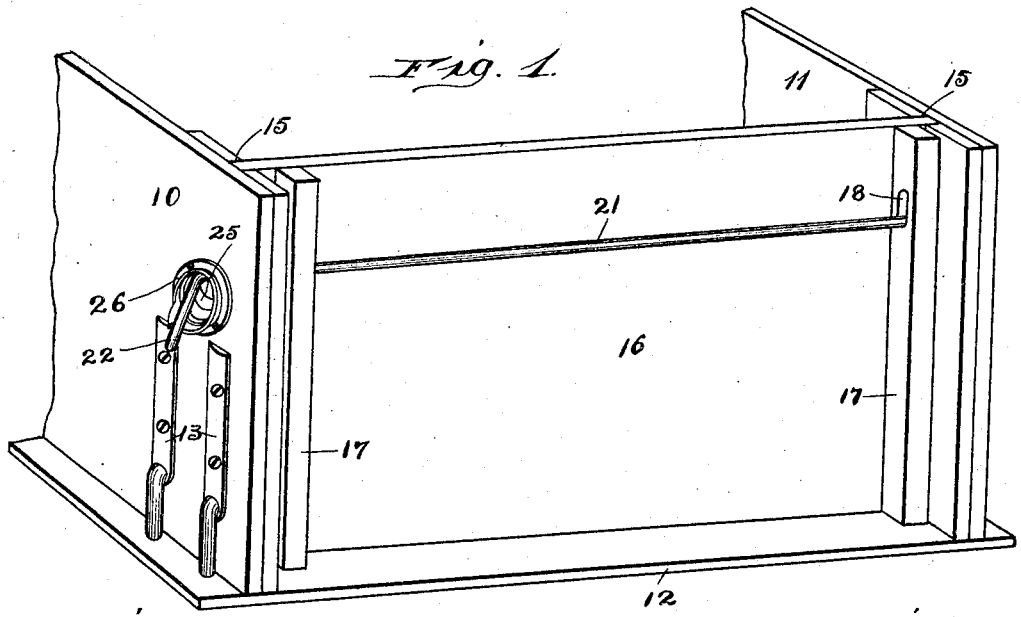
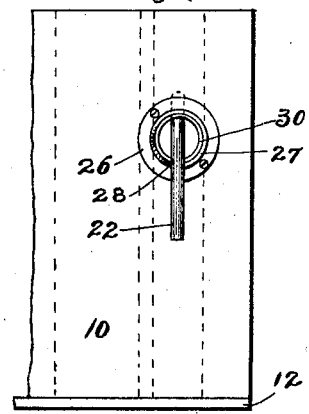
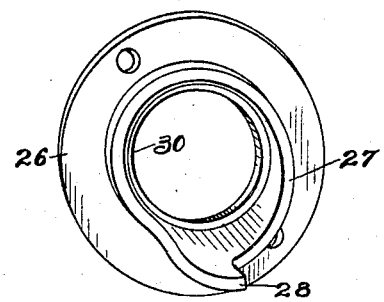
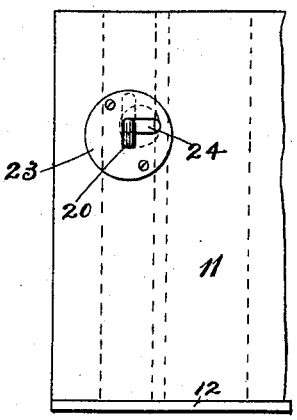
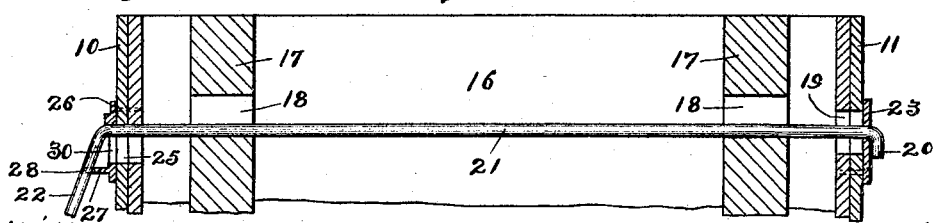
Witnesses:
Chas. E. Gorton
A Gustafson
Inventor:
Herschel A. Schermerhorn
By Chas. C. Tithrow
Atty.

No. 793,398.

Patented June 27, 1905.

UNITED STATES PATENT OFFICE.

HERSCHEL A. SCHERMERHORN, OF SHABBONA, ILLINOIS.

FASTENING FOR WAGON END-GATES.

SPECIFICATION forming part of Letters Patent No. 793,398, dated June 27, 1905.

Application filed March 24, 1905. Serial No. 251,713.

*To all whom it may concern:*

Be it known that I, HERSCHEL A. SCHERMERHORN, a citizen of the United States, residing at Shabbona, in the county of Dekalb and State of Illinois, have invented certain new and useful Improvements in Fastenings for Wagon End-Gates, of which the following is a specification.

My present invention relates to improvements in fastenings for wagon end-gates; and the objects thereof are substantially the same as those set forth in my application for patent for improvements in fastenings for wagon end-gates, filed December 10, 1904, Serial No. 236,306, and allowed on February 8, 1905, and those set forth in Letters Patent No. 732,965, issued to me on the 7th day of July, 1903—namely, to provide means for fastening the end-gates of wagons, which shall be cheaper in construction, more efficient in operation, and durable than the devices described in my aforesaid application and patent and which shall be so made that the ordinary rods with nuts on the ends employed for connecting the sides of the wagon-body together and for holding the end-gates in place, which rods often become useless by reason of the loss of nuts used thereon or the screw-threads being worn or stripped off, may be dispensed with. In using the fastenings for wagon end-gates constructed in accordance with my said application and patent I have found that by reason of the great inward pressure exerted on the sides of the wagon-body by the cranked tie-rod used that the bearing-plate on one side of the body as formerly constructed is caused to bite into or to be depressed at its lower portion into the side to which it is secured by reason of the fact that the pressure of the impinging crank bears on said lower portion, while there is no pressure, or but little, on the upper portion of the bearing-plate. This depression or biting into the side board by the bearing-plate causes it after considerable usage to become loose on its securing screws or rivets, besides to wear away the wooden side of the body. To overcome the above-mentioned objection by so constructing the bearing-plate that the pressure of the crank on the tie-rod will be at the center thereof, thus evenly distributing the pressure, is another and important object of this invention.

I have also found that by enlarging and making circular the opening in the cam-plate considerable material is saved, and besides said plate can be more securely fastened to the side of the body by placing the screws or rivets therefor outside of the cam instead of inside thereof, as formerly done. I have further discovered that by using a tie-rod with a crank-handle formed thereon at an obtuse angle thereto to act on the cam-plate can be more easily adjusted or deflected from a greater to a smaller angle, or vice versa, in order to allow for shrinkage or wear of the wood.

In order to enable others skilled in the art to which my invention pertains to make and use the same, I will now proceed to describe it, referring to the accompanying drawings, in which—

Figure 1 is a perspective view of the rear portion of a wagon-body, showing an end-gate secured in place thereon by means of a fastening embodying my invention. Fig. 2 is a view in side elevation of a portion of one of the sides of the box or body, showing the cam-plate thereon and illustrating the crank-handle on the tie-rod as being turned to its locked position. Fig. 3 is a similar view of a portion of the opposite side of the body, showing the bearing-plate for the crank on the opposite end of the tie-rod. Fig. 4 is a perspective view of the cam-plate. Fig. 5 is a cross-sectional view of a portion of the wagon-body, taken on line 5 5 of Fig. 2 looking in the direction indicated by the arrows.

Like numerals of reference refer to corresponding parts throughout the different views of the drawings.

The reference-numerals 10 and 11 indicate the sides of the wagon-body, which may be secured to the bottom 12 thereof by means of clips 13, which pass through the body, and may have nuts on their lower ends, (not shown,) as usual. Each of the sides is provided on its inner surface near its rear end with a vertical groove 15 to receive the ends of the end-gate 16, which is provided near each of its ends, and preferably on its outer surface, with transverse cleats 17, each of which is provided near its upper end with an opening 18, which is elongated and extends therethrough and longitudinally therewith. The side 11 of the body is provided at a point therein to register with the opening 18 in one of the cleats on the end-gate with an opening 19, sufficiently large to permit of the crank 20 on one end of the tie-rod 21, which connects the sides 10 and 11 together, to pass. The outer surface of the side 11 has secured thereon a bearing-plate 23, which is provided with a horizontally-disposed opening 24, the lower edge of which when the plate 23 is secured in place on the side 11 of the wagon-body will lie in a horizontal line with the lower edge of the opening 18 in the cleat 17 adjacent to said side of the body. The opening 24 is preferably elongated and of sufficient width and length to permit of the passage of the end of the tie-rod 21 and the crank 20 thereon, yet of a size to fit the rod snugly inwardly from said crank. As shown, this opening 24 is eccentrically located in the bearing-plate 23, so that when the crank 20 is turned to its locked position, as shown in Figs. 3 and 5 of the drawings, the pressure thereof will be presented to the center of the plate, thus equalizing or evenly distributing the pressure.

The side 10 of the body is provided with an opening 25 therein at a point to register with the opening 18 in the cleat 17 adjacent thereto, which opening is also sufficient in size to permit of the passage of the crank 20 on one end of the tie-rod. Secured to the outer surface of the side 10 over the opening 25 therein is a cam-plate 26—that is, a plate which has on its outer face an annular flange 27, which has its free edge downwardly and outwardly inclined and is provided in its lower portion with a projection 28 to act as a stop for the crank-handle on the tie-rod. The plate 26 has therein a circular opening 30, which when said plate is secured in place on the side 10 will register with the opening 25 in the body, and its upper portion, as well as that of the opening 25, will be located a distance above the lower portion of the opening 18 in the cleat 17 adjacent to the side 10 about equal to the diameter of the tie-rod.

The end of the tie-rod 21 opposite that which is provided with the crank 20 is formed or provided with a crank-handle 22, which is arranged at an obtuse angle to the rod 21, as is clearly shown in Fig. 5 of the drawings. By thus forming the tie-rod 21 with the obtuse-angled crank-handle it is apparent that if said handle or if the ends of the end-gate become worn by constant use, so that it will not act on the cam 27 in order to draw the sides 10 and 11 toward each other, the angle of the handle 22 may be decreased by simply fastening it, for instance, between the inner portions of the spokes of the wagon-wheel and deflected to the desired position.

The operation is simple and as follows: The end-gate 16 is inserted in the vertical grooves 15, when by presenting the crank 20 to the opening 30 in the cam-plate it is evident that it may be passed through said opening, when by turning the rod 21 so that the crank 20 will assume a vertical position it may be passed through the openings 18 in the cleats 17, after which the rod 21 may again be turned so that the crank 20 will lie horizontally, when it may be passed through the horizontal opening 24 in the plate 23, which is employed to engage the crank 20 and, as before stated, to prevent it wearing the side 11 of the body. After thus having been passed through said openings it is apparent that the rod 21 may be turned so that the crank 20 will project at a right angle to the opening 24, thus preventing the withdrawal of the rod and presenting the pressure of the crank 20 thereon centrally and equally to the bearing-plate. As the opposite end of the rod 21 is provided with the obtuse-angled crank-handle 22, it is obvious that it will coact with the cam 27 in such a way as to draw the sides of the body together and against the ends of the end-gate, thereby firmly securing it against movement.

Having thus fully described my invention, what I claim as new, and desire to secure by Letters Patent, is—

1. In a fastening for wagon end-gates, the combination with the sides of the body each provided with an opening near its rear end, of a bearing-plate having an eccentrically-located opening therein and secured to the outer surface of one of the sides over the opening in said side, an end-gate located between said sides, and a tie-rod having a crank at one of its ends to engage the bearing-plate, substantially as described.

2. In a fastening for wagon end-gates, the combination with the sides of the body each provided with an opening near its rear end, of a bearing-plate having an elongated opening eccentrically arranged therein and secured to the outer surface of one of said sides over the opening therein, an end-gate located between said sides, and a tie-rod having a crank at one of its ends to engage the bearing-plate and a crank-handle at its other end, substantially as described.

3. In a fastening for wagon end-gates, the combination with the sides of the body each provided with an opening near its rear end, of an apertured plate secured to the outer surface of one of the sides over the opening therein and having on its outer face an upright cam, an end-gate located between said sides, and a tie-rod having a crank at one of its ends and an obtuse-angled crank-handle at the other end to engage said cam, substantially as described.

4. In a fastening for wagon end-gates, the combination with the sides of the body each provided with an opening near its rear end, of a bearing-plate having an opening eccentrically arranged therein and secured to the outer surface of one of said sides over the opening therein, an apertured plate secured to the outer surface of the other side over the opening therein and having on its outer face an upright cam, an end-gate located between said sides, and a tie-rod having a crank at one of its ends to engage the bearing-plate and an obtuse-angled crank-handle at its other end to engage the cam, substantially as described.

HERSCHEL A. SCHERMERHORN.

Witnesses:
CHAS. C. TILLMAN,
A. GUSTAFSON.